May 20, 1958  E. W. BOTTUM  2,835,391
SINGLE OPEN END TYPE FILTER CONSTRUCTION
Filed July 12, 1954
Fig. 1
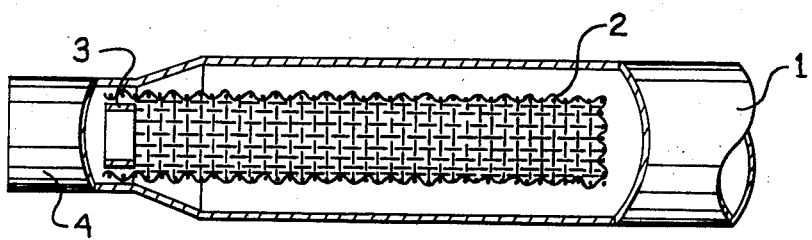
Fig. 2
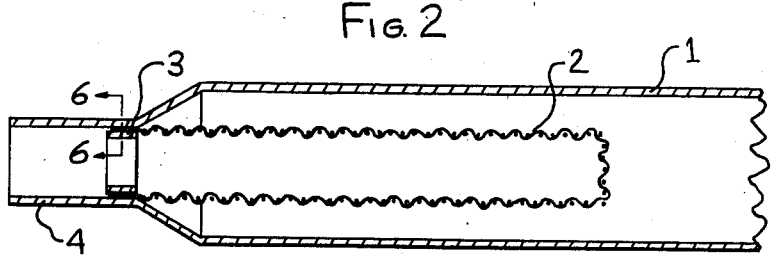
Fig. 3
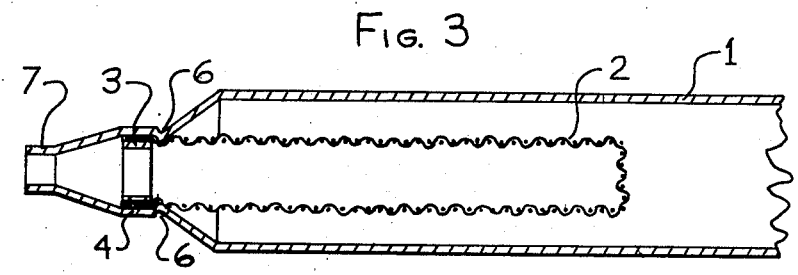
Fig. 4      Fig. 5      Fig. 6
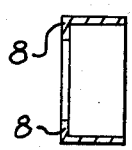 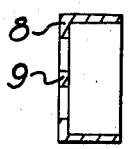 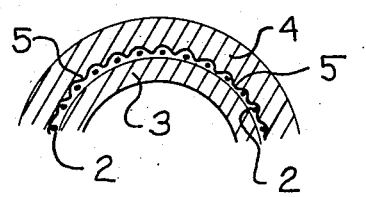
Fig. 7
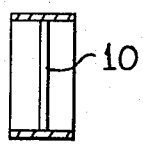
*INVENTOR.*
EDWARD W. BOTTUM
BY
Smith, Olsen & Kotts

United States Patent Office 2,835,391
Patented May 20, 1958

2,835,391
SINGLE OPEN END TYPE FILTER CONSTRUCTION

Edward W. Bottum, Detroit, Mich.

Application July 12, 1954, Serial No. 442,803

1 Claim. (Cl. 210—448)

This invention relates to line strainers, and more particularly to strainers of this character which are used in refrigeration systems.

It is a principal object of the invention to reduce the cost of strainer construction by utilizing a simple method and mechanism for securing the strainer within its conduit.

Other objects of this invention will appear in the following description and appended claim, reference being had to the accompanying drawings forming a part of this specification wherein like reference characters designate corresponding parts in the several views.

In the drawings:

Figure 1 is a cross sectional view of the inlet end of a tube or conduit with the strainer screen (in dotted lines) in place prior to its being fastened therein.

Figure 2 is a view similar to Figure 1 but taken after the screen has been fastened in the tube or conduit.

Figure 3 is a view similar to Figure 2 but illustrating a modified form of the invention in which the tube or shell is reduced at its end for connection with a conduit of relatively small diameter, and dimple means are provided to position the screen in place prior to its being fastened in place.

Figures 4 and 5 show modified forms of rings for fastening the screen within the tube or conduit.

Figure 6 is an enlarged view taken on line 6—6 of Figure 2.

Figure 7 shows a modified form of ring for fastening the screen within the tube or conduit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring in greater detail to the drawings, the strainer construction there shown includes a cylindrically shaped screen 2 mounted between a reduced portion 4 of the tube or conduit 1 and the outer periphery of ring 3. In Figure 1 the screen and ring are loosely mounted in portion 4. To fasten the screen in the tube all that is needed is a pressing or swaging operation in which tube portion 4 is pressed against screen 2 until portions 5 thereof are forced into the spaces between the screen wires, thereby locking the screen in place as shown in Figure 6. With this type of fastening procedure the conventional binding, and the costs involved therewith, is eliminated.

Although the method of fastening a strainer within a tube has been shown as applied to a cylindrical screen it is contemplated that other shapes of screens could be fastened using the same method.

The construction shown in Figure 3 is the same as that shown in Figures 1 and 2 except that prior to insertion of the screen and ring, tube 1 is provided with a dimple 6 for accurately positioning ring 3 within reduced portion 4. Portion 4 may be further reduced in diameter as shown at 7 for connection with a conduit of relatively small diameter. Instead of reducing the tube diameter as shown at 7, the tube could have its end portion enlarged for connection with a conduit of relatively large diameter.

The ring structures shown in Figures 4, 5 and 7 are interchangeable with the ring shown in Figure 1.

The ring illustrated in Figure 4 is provided with a flange 8 for strengthening it against the force of the previously described pressing operation used to mount the screen in the tube.

The ring shown in Figure 5 is the same as that shown in Figure 4 except that a strengthening bar 9 is included to help absorb the force from the previously described pressing operation.

The ring shown in Figure 7 is the same as that shown in Figure 1 except that a rod 10 has been provided for strengthening the ring against the previously described pressing operation.

From the foregoing description, taken in conjunction with the accompanying drawings, it can be seen that a strainer construction has been provided wherein the cost of fastening the screen in its tube is kept to a minimum.

I claim:

A strainer construction comprising a one piece conduit having an intermediate section and end sections; one of said end sections being of reduced diameter as compared with the intermediate section and having a cylindrical inner surface; a rigid ring within said reduced diameter end section and having a cylindrical outer face; and a sleeve-like screen having a cylindrical end portion thereof engaging the outer cylindrical surface of the ring and the inner cylindrical surface of the reduced diameter end section; the inner surface portions of said reduced diameter end section projecting into the screen spaces to securely lock the screen in the conduit; said sleeve-like screen extending from the ring into the intermediate conduit section in spaced relation with the intermediate section wall, whereby all of the screen portions within the intermediate section are enabled to act as strainer media.

References Cited in the file of this patent

UNITED STATES PATENTS

| | | |
|---|---|---|
| 1,387,789 | Lyons | Aug. 16, 1921 |
| 1,688,401 | Slagel | Oct. 23, 1928 |
| 2,121,624 | Cowles | June 21, 1938 |
| 2,145,047 | Goldkamp | Jan. 24, 1939 |
| 2,216,686 | Fentress | Oct. 1, 1940 |
| 2,304,142 | Brickford | Dec. 8, 1942 |
| 2,310,536 | Melsom | Feb. 9, 1943 |
| 2,384,057 | Wetherell | Sept. 4, 1945 |
| 2,548,965 | Gaugler | Apr. 17, 1951 |
| 2,600,219 | Diederich | June 10, 1952 |
| 2,705,013 | Brothers | Mar. 29, 1955 |

FOREIGN PATENTS

| | | |
|---|---|---|
| 128,150 | Great Britain | June 19, 1919 |